UNITED STATES PATENT OFFICE.

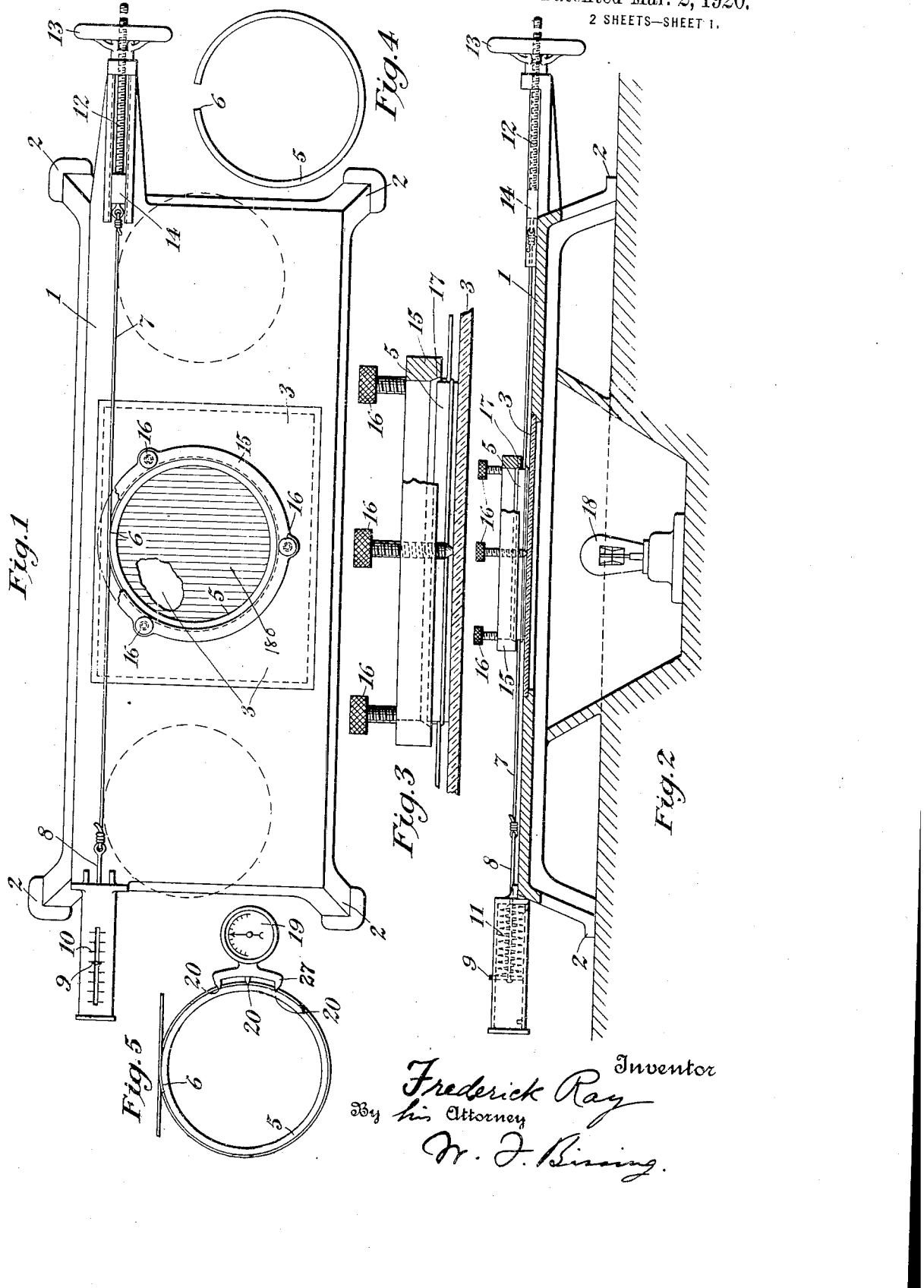

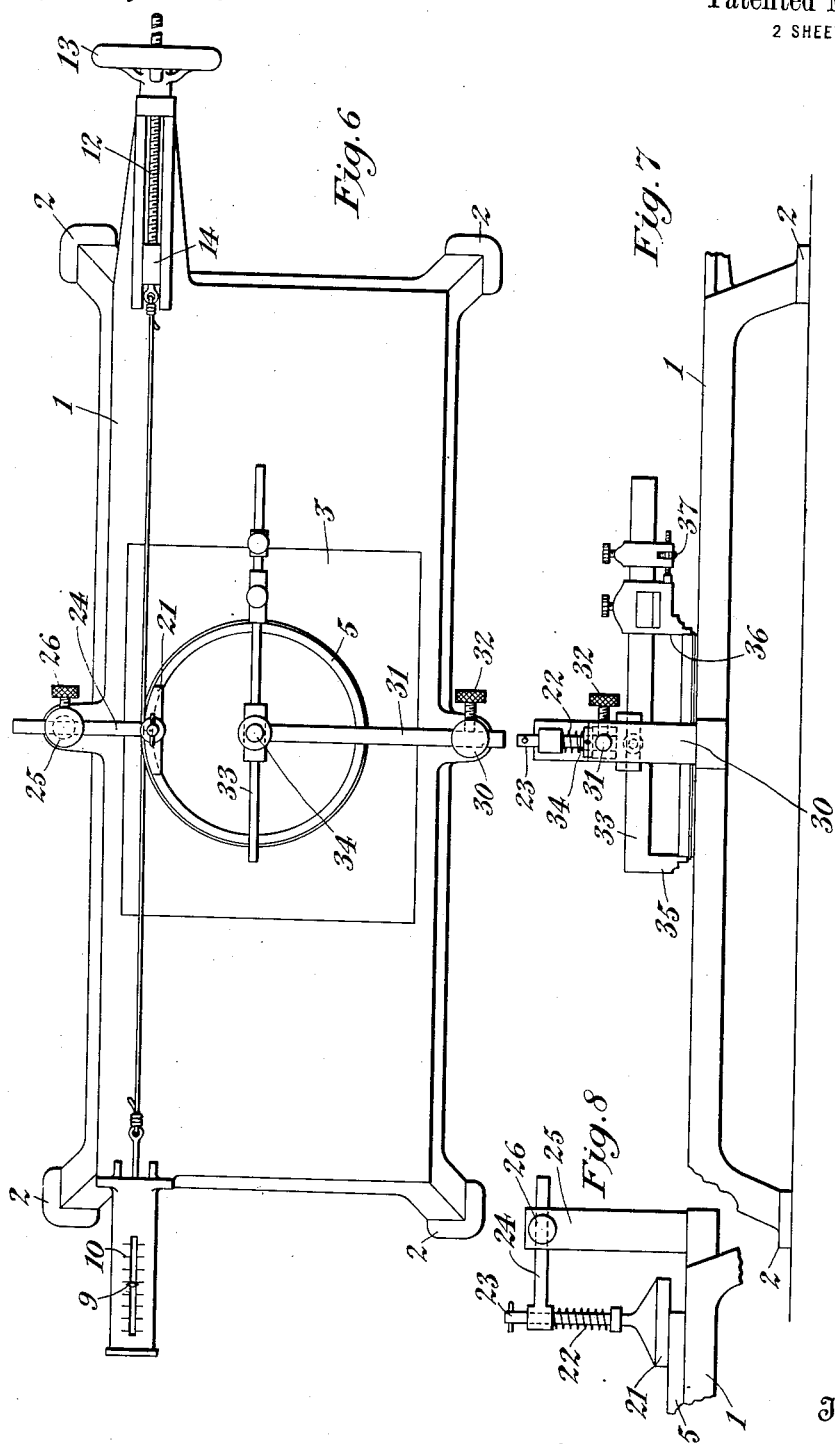

FREDERICK RAY, OF SHORT HILLS, NEW JERSEY.

RING-GAGING INSTRUMENT.

1,332,570.  Specification of Letters Patent.  Patented Mar. 2, 1920.

Application filed April 27, 1916. Serial No. 93,904.

*To all whom it may concern:*

Be it known that I, FREDERICK RAY, a citizen of the United States, residing at Short Hills, Essex county, State of New Jersey, have invented certain new and useful Improvements in Ring-Gaging Instruments, of which the following is a specification.

My invention relates to gaging instruments for gaging metal, resilient piston rings which are divided at one point and particularly for gaging the radial reaction of such a ring and determining when the ring assumes a circular form.

One of the objects of my invention is to accurately determine whether or not a divided ring which has been hammered, treated, or suitably designed as by giving it a special shape so as to exert a uniform, radial, outward pressure when circular, does in fact accomplish this result. Another object of my invention is to provide a gaging instrument in which uniform, radial pressure is simultaneously applied at a number of points uniformly distributed around the circumference of the ring, and to indicate by means of a reference ring or measuring device when the ring has assumed a circular shape. Under this condition it will exert a uniform, radial, outward pressure.

With the above and other objects in view my invention consists in the parts, improvements and combinations more fully pointed out hereinafter.

Referring now to the drawings which form part of the specification:

Figure 1 shows a plan view of the gaging instrument as well as a divided ring whose radial pressure is about to be measured;

Fig. 2 is a vertical cross-section of the machine shown in Fig. 1;

Fig. 3 is an enlarged detail of the transparent platform, the ring mounted thereon and the reference ring above it;

Fig. 4 is a view illustrating the split ring of uniform cross-section which has opened out because of its outward pressure;

Fig. 5 shows another step in the operation of gaging the ring;

Fig. 6 illustrates another embodiment of the invention in which a clamp and measuring calipers are used to measure the circularity of the ring;

Fig. 7 is a side elevation of Fig. 6; and

Fig. 8 is a detail showing the clamp.

In the machine illustrated the table 1 supported by legs 2 carries a platform 3 flush with the table and preferably transparent. It may be made of ground glass. The ring to be gaged is indicated by the numeral 5, divided at 6, and is illustrated in Fig. 4. It will be noted that after the ring has been hammered in a hammering machine, the ring opens outwardly under the influence of the stresses imparted to the ring.

In accordance with my invention I provide a method and means for gaging the radial reaction of the divided ring. In accordance with the method, the ring which reacts against radial compression is first subjected to a distributed radial load and the resultant shape of the ring is thereafter determined. By subjecting the ring to a uniformly distributed radial load, or to a distributed radial load which approaches uniformity as the ring approaches circularity, the system of radial loads automatically varying in intensity as the ring approaches circular shape, and by permitting the ring to freely contract, it follows that if the ring has been hammered, treated or designed so as to exert a uniform radial pressure outwardly at all points throughout its circumference, when circular, it will under a uniformly distributed radial load assume a circular shape. A departure from this circular shape indicates that the ring is not exerting a uniform radial pressure outwardly.

Means, which may be widely varied, are provided for imparting a distributed load to the ring. In the form of the invention illustrated these means comprise a flexible strip 7 which is wrapped around the ring, together with means for tensioning the strip. In the particular form of the invention shown, the strip is attached at one end to a rod 8, which is urged in one direction by a spring 11 that applies tension to the strip. The pointer 9 attached to rod 8 moves over the scale 10 to indicate the tension. Suitable means are provided for varying the tension of the strip. The screw 12, wheel 13 and slide 14, the latter being attached to the free end of the strip 7, are used to vary the tension to which the strip is subjected.

The ring having been inserted in the strip 7 and contracted radially by operating the screw 12 until the desired end clearance exists between the ends of the ring, means are provided whereby a portion of the strip under uniform tension may be utilized to encircle the ring thus avoiding any unequal distribution of tension in the part of the strip surrounding the ring due to friction between the ring and the strip. It will be observed that the portions of the strip at the right and left of the ring in Fig. 1 are under uniform tension. The ring is freely supported on the platform 3 which is longer than the diameter of the ring and is rolled by hand to the right in order to unwrap the portion of the strip surrounding it and to replace it with another portion of the strip under uniform tension. The ring will then be in the position shown in dotted lines to the right of Fig. 1, and the right hand portion of the strip under uniform tension will now be lying around one-half of the ring. The ring is then moved to the left as shown in dotted lines and the left hand portion of the strip under uniform tension is made to encircle the ring. The whole of the ring is now encircled by a strip under uniform tension and the ring may now be brought to any desired place on the platform for measurement. The ring is thus subjected to a system of radial pressures which will be uniform and uniformly distributed when the ring assumes a circular shape and which if the ring departs from a circular form automatically tends to restore the ring to circular shape.

Suitable means are provided for indicating the circularity or lack of circularity of the ring when in its resultant form. In the preferred embodiment of the invention I make use of an additional reference ring 15 accurately ground on its inside to circular form. This ring is supported upon three leveling screws 16 which rest upon the table above the ring to be gaged for leveling and adjusting it toward and from the ring 5. The reference ring may be moved toward and from the strip and the reference ring is likewise movable in the direction of the strip thus permitting an accurate setting of the reference ring over the ring to be gaged. The reference ring is provided with a beveled portion 17 which compensates for slight differences in size of the rings to be gaged. A source of illumination 18 is placed beneath the center of the transparent platform 3 (a black spot or screen 180 preventing light from shining through the center of the ring) so as to cause a glow through the space between the offset portion 17 and the outer edge of the ring. It can thus accurately be observed whether or not the ring is truly circular.

If any variations from circularity are observed the spherometer 27 with indicating dial 19 and the three-point bearings 20, all of usual form, may be used to determine the circularity of the ring at any point. This operation is illustrated in Fig. 5.

In the embodiment of the invention illustrated in Fig. 6, in addition to certain parts illustrated in Fig. 1, which bear the same reference numerals, the clamp 21 is provided for holding the ring down upon the platform after it has been compressed by the flexible strip. The clamp 21 is pressed down by spring 22 and is carried by rod 23 which is mounted in an arm 24 supported by a post 25 to which the arm is adjustably secured by set screw 26.

Means are also provided for indicating the circularity of the ring by accurately measuring the diameter of the ring at various points. A post 30 carries an arm 31, passing through the top of the post to which it is secured by set screw 32. To one end of the arm 31 a measuring instrument namely a vernier caliper 33 is pivotally connected at 34. The jaws of the caliper are set to measure the diameter of the ring, one jaw being fixed to the scale of the caliper and the other jaw 36 being slidable and adjustable by adjusting screw 37. By rotating the caliper on pivot 34 the diameter of the ring at various points may be measured. The reference ring, the spherometer and the calipers each constitute means for indicating the circularity or the departure from circular form of the ring, and indicate its distortion.

Having now described the construction, the operation of the instrument will be clear. A ring is inserted in the loop of the strip and compressed. The ring is then rolled to the right and left and brought back to an intermediate position. Then either by a reference ring or by a measuring caliper, the circularity or lack of circularity of the ring is accurately determined. If the ring is circular the radial reaction is equal at all points of its circumference.

As many changes could be made in the above construction and process and many apparently widely different embodiments of this invention could be made without departing from the scope thereof, it will be understood that my invention is not limited to the particular forms of the invention illustrated.

The magnitude of the reaction per inch of circumference of the ring is equal to the tension in the flexible strip divided by the outside radius of the ring.

Having described my invention what I claim is:

1. An instrument for gaging the radial reaction of a metal, resilient piston ring, which is divided at one point, and whch reacts against radial compression, comprising means for imparting a distributed load about the ring and means for indicating the resultant distortion of the ring while the ring is subjected to said load.

2. An instrument for gaging the radial reaction of a metal, resilient piston ring, which is divided at one point, and which reacts against radial compression, comprising means for imparting a uniformly distributed load about the ring, and means for indicating the departure from circular form of the ring while the ring is under load.

3. An instrument for gaging the radial reaction of a metal, resilient piston ring, which is divided at one point and which reacts against radial compression, comprising means for simultaneously imparting radial uniform pressure around the circumference of the ring so as to cause the ring to tend to assume a circular shape, and means for indicating the departure from circular form of the ring.

4. An instrument for gaging the radial reaction of a metal, resilient piston ring, which is divided at one point and which reacts against radial compression, comprising means tending to impart to said ring a circular form, and means coöperating therewith for gaging the circularity imparted to said ring.

5. An instrument for gaging the radial reaction of a metal, resilient piston ring, which is divided at one point and which reacts against radial compression, comprising means supplying a system of radial forces of varying intensity to said ring, and indicating means for determining when said ring assumes a circular shape.

6. In a gaging machine for gaging the radial reaction of a metal, resilient piston ring, which is divided at one point and which reacts against radial compression, the combination of compressing means for simultaneously applying pressure at various points on the ring, yielding means for stressing the said compressing means, and means for indicating the resultant form of the ring.

7. In an instrument for gaging a metal, resilient piston ring, divided at one point, and which reacts against radial compression, the combination of means for imparting a distributed load about the ring, so as to cause it to assume a predetermined shape, and a reference ring for indicating the resultant distortion while the ring is subjected to said load.

8. In an instrument for gaging a metal, resilient piston ring, divided at one point, and which reacts against radial compression, the combination of means for imparting a distributed load about the ring, a reference ring for indicating the resultant distortion, and means for leveling said reference ring.

9. In an instrument for gaging a divided ring, the combination of means for imparting a distributed load about the ring, a reference ring for indicating the resultant distortion, said reference ring having a circumferential beveled portion, and means for leveling said reference ring.

10. An instrument for gaging the radial reaction of a metal, resilient piston ring, divided at one point and which reacts against radial compression, comprising a flexible strip surrounding said ring for imparting a distributed load to the ring, a portion of said strip under uniform tension being wrapped around the ring, and means for indicating the resultant distortion of the ring while embraced by said strip.

11. In an instrument for gaging a divided ring, the combination of means for imparting yielding, radial pressure at a number of points around the circumference of the ring, means for adjusting and means for indicating said pressure, and means for indicating the resultant distortion of the ring.

12. In an instrument for gaging a divided ring, the combination of a flexible strip for encircling and compressing said ring, a tightening device for said strip, a spring for tensioning said strip and means for indicating the resultant form of the ring.

13. An instrument for gaging a metal, resilient piston ring, divided at one point, and which reacts against radial compression comprising a platform on which the ring is supported and on which it can expand and contract freely, a flexible strip surrounding said ring for compressing it to a circular shape, a portion of said strip under uniform tension being wrapped around the ring, means for imparting tension to said strip, and a reference ring located above the ring to be gaged.

14. An instrument for gaging a metal, resilient piston ring, divided at one point, and which reacts against radial compression comprising a platform on which the ring is supported, and on which it can expand and contract and slide, a flexible strip surrounding said ring, a portion of said strip under uniform tension being wrapped around the ring, said strip being connected to supports at the opposite ends of the platform, and said platform having a length greater than the diameter of the ring, means for imparting tension to said strip, and means for indicating the circularity of the ring to be gaged.

15. In an instrument for gaging a metal, resilient piston ring, divided at one point, the combination of a transparent platform supporting the ring, a source of illumination beneath the platform, a flexible strip surrounding said ring, means for imparting tension to said strip, and a reference ring carried by said platform and mounted above the ring to be gaged.

16. In an instrument for gaging a metal, resilient piston ring divided at one point, the combination of a support for the ring, means for imparting a load thereto comprising a flexible strip adjacent the support and adapted to surround the ring, and means for drawing upon the strip so as to compress the ring, whereby in its compressed condition any departure from circularity may be observed with the aid of a suitable gage.

17. In an instrument for gaging a divided ring, the combination of a support for the ring, means for imparting a load thereto comprising a flexible strip adjacent the support adapted to surround the ring and to extend therefrom, and means for imparting a desired degree of tension to the strip to compress the ring, said support permitting the ring to be rolled while within the embrace of the strip so as to insure the ring being encircled by a portion of the strip under uniform tension throughout its length, the whole being designed to be employed in connection with a gage for ascertaining any departure from circularity in the compressed ring.

18. In an instrument for gaging a metal, resilient piston ring, the combination of a support for the ring, means for imparting a distributed load thereto comprising a flexible strip, adjacent the support adapted to surround the ring, a tensioning spring, and a tightening device both connected with the flexible strip for compressing the ring, whereby any departure from circularity may be observed with the aid of a suitable gage.

19. In an instrument for gaging a divided ring, the combination of means for compressing the ring so as to cause it to tend to assume a circular form, a reference ring, and means for causing light rays to pass between the compressed ring and the reference ring.

20. The method of gaging the radial reaction of a divided ring which consists in subjecting the ring to a distributed radial compressing load and determining the resultant shape of the ring.

21. The method of gaging the radial reaction of a divided ring which consists in applying uniformly distributed radial forces to the ring to cause it to contract and determining the resultant shape assumed by the ring.

22. The method of gaging the radial reaction of a divided ring which is intended to exert a uniform outward radial pressure when compressed to a circular shape, consisting in subjecting the freely supported ring to a uniformly distributed system of inwardly directed forces and observing the circularity or non-circularity of the ring.

23. The method of gaging the radial reaction of a divided ring, which consists in compressing the ring in a portion of a flexible strip under uniform tension throughout its length and determining the resultant shape of the ring.

24. The method of gaging the radial reaction of a metal, resilient piston ring, divided at one point and which reacts against radial compression, which consists in compressing the ring in a portion of a flexible strip under tension, rolling the ring along the strip so as to bring the portion of the strip contacting with the ring under uniform tension, and determining the circularity or departure from circularity of the resultant shape of the ring.

In testimony whereof, I have signed my name to this specification, in the presence of two subscribing witnesses.

FREDERICK RAY.

Witnesses:
J. HOWARD BREESE,
LOUELLA F. LITTLE.